Patented Nov. 10, 1931

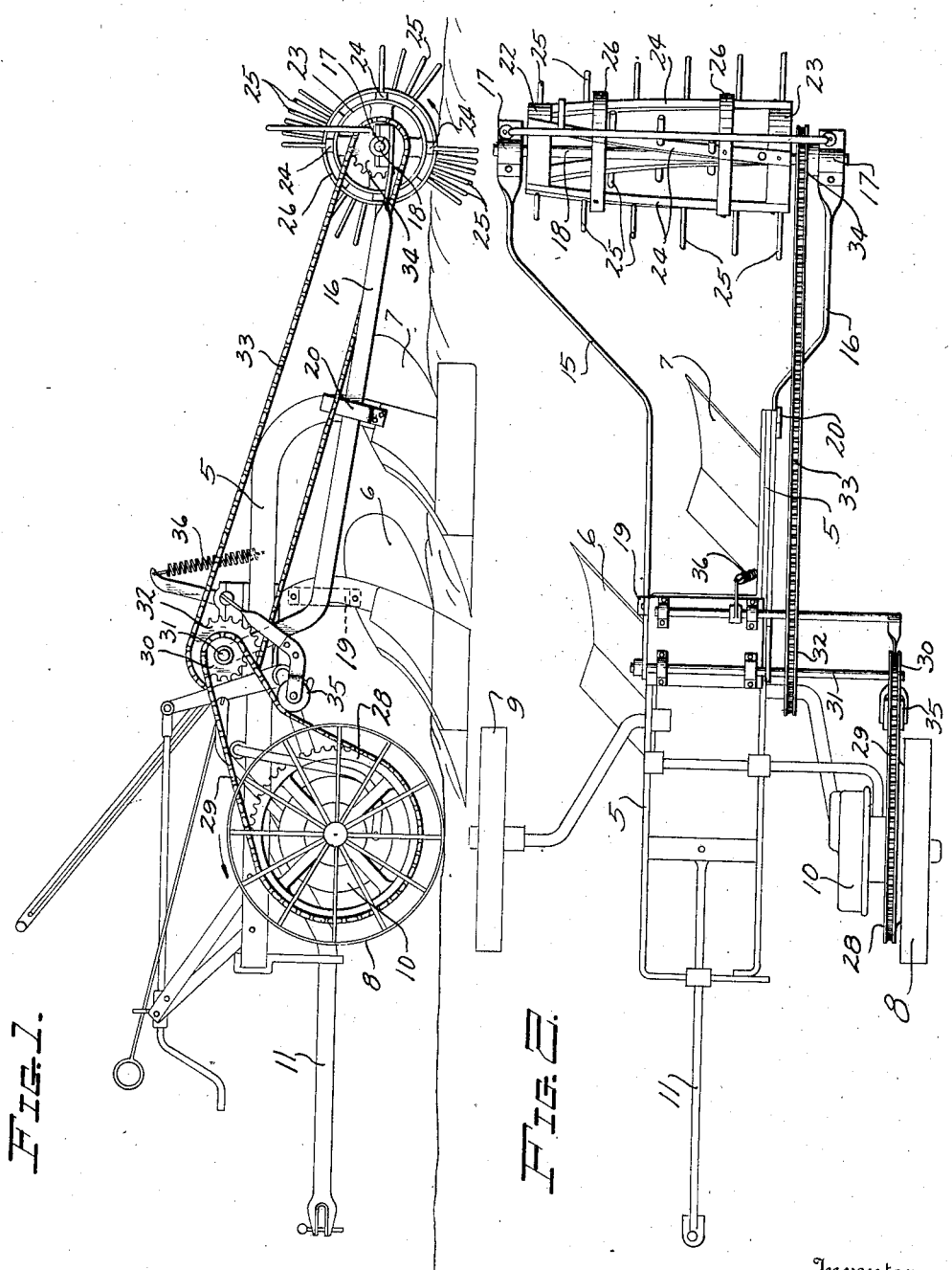

1,831,511

UNITED STATES PATENT OFFICE

ERWIN L. SCHULTZ AND FRANK HALLISCH, OF THIENSVILLE, WISCONSIN

AGRICULTURAL IMPLEMENT

Application filed September 27, 1929. Serial No. 395,542.

This invention relates to improvements in agricultural implements.

It is the primary object of the invention to provide a combination plow and cultivator which co-act in a novel way to lift weeds, and particularly quack grass roots from the soil, while leaving the soil in complete readiness for planting.

More particularly stated, it is our purpose to provide a rotary cultivator applicable to a wheeled plow and adapted to act immediately upon the earth turned by the plow to break up clods and lift roots to the surface without any great expenditure of energy.

A further object of the invention is to provide a device so associated with a plow designed for use with tractors that when the plow is lifted from the ground the cultivating attachment will automatically be lifted with it while at other times the attachment will float independently on the surface of the ground to be cultivated.

In the drawings;

Figure 1 is a side elevation of an implement embodying this invention.

Figure 2 is a plan view thereof.

Like parts are identified by the same reference characters throughout the several views.

At 5 there appears the frame of one standard type of double gang wheeled plow to which my invention is applicable. The plow shares are shown at 6 and 7. The wheel 8 runs on unplowed land while wheel 9 operates on ground previously worked. Means which it is unnecessary to describe in detail for the purposes of the present application are employed at 10 for lifting and lowering frame 5 and plow shares 6 and 7 under the control of an operator riding a tractor which pulls the apparatus by means of the draw bar 11.

In accordance with this invention a floating frame comprising side bars 15 and 16 is pivoted to the frame 5 and is provided with bearings 17 for the cross shaft 18 of the cultivator. Suitable guides at 19 and 20 permit the sub-frame a limited degree of independent or floating movement with respect to the plow frame 5. The arrangement is such that when the plow shares are lowered into the earth the sub-frame will float upwardly on guides 20 and will be free for such independent floating movement as may be occasioned by the operation of the cultivator over the surface of the ground. When the plow shares are lifted from the ground, however, the guides 19 and 20 pick up the sub-frame and impart the lifting movement to the entire cultivator, thereby hoisting it free of the earth.

The cultivator comprises a high speed reel mounted on shaft 18 and comprising headers 22 and 23 joined by supporting bars 24 which are correspondingly inclined in a direction of reel rotation from header 22 to header 23. These bars carry cultivator teeth 25 which are spaced at suitable intervals and are preferably staggered as shown. The rings 26 connect intermediate portions of bars 24 and serve not only to brace bars from each other, but to float the cultivator on the surface of the plowed ground.

In order to drive the high speed reel, which rotates in a counterclockwise direction as viewed in Fig. 1, we provide the plow wheel 8 with a sprocket at 28 which is connected by means of the chain 29 with the small sprocket 30 on shaft 31. The large sprocket 32 on this shaft is directly connected by a chain 33 with sprocket 34 on the shaft which carries the reel. The sizes of sprockets employed are such that the reel operates very materially faster than the wheel 8.

Not only does the cultivating reel operate more rapidly than the wheel 8, but its ground rate of rotation is also considerably greater than its rate of travel over the ground. Accordingly its teeth or pegs 25 cut through the freshly turned earth, breaking it up into very small particles. Movement of the cultivator teeth 25 through the earth is greatly facilitated by the fact that the teeth are disposed in a row which is inclined with reference to the direction of travel, so that all of the teeth do not enter the earth at once. In effect substantially the entire power of the machine is exerted upon each individual tooth successively. This construction also has a pronounced advantage in freeing the roots of weeds from the soil. If the teeth were all in line tranverse with the machine they would tend to operate with a combined effect like that of a shovel to lift unbroken clods and throw them with roots intact therein. The successive action of the several teeth of the device as disclosed tends to free the roots throughout their length, and as the teeth leave the soil they strain the roots from the broken earth and toss the roots in the air to fall on the surface.

The device herein disclosed requires very little power for its operation, and in fact uses less power than a drag or any other cultivator known to us. Its direction of rotation is such that insofar as it reacts with the earth the cultivating attachment tends to propel the entire device in a forward direction.

While a cultivator embodying the invention herein disclosed is useful in and of itself for reducing soil to a finely divided or pulverized condition preparatory to planting, it is almost essential for weed removal that the cultivator be used in combination with a plow as shown. With particular reference to quack grass, it may be pointed out that the roots of this weed lie a short distance below the surface of the ground and are provided with branches and numerous joints along the main roots and branches. Every such joint is capable of sending forth new roots and becoming an individual plant. A drag or harrow used to cultivate plowed soil merely tears quack grass roots and leaves the majority of the fragments of roots embedded in the soil in a position for new growth. The present device lifts practically all such roots to the surface and accomplishes this result with very little breakage of the roots except where they are necessarily severed by the plows themselves. The reel herein disclosed however, could not satisfactorily accomplish this result in ordinary soil except by acting on the soil immediately behind the plows to which it is attached. While the soil is moist and freshly turned it is readily pulverized and disintegrated to free the roots, whereas if it is allowed to stand even for a few minutes after plowing parts of the soil harden in lumps which retain their integrity even under the action of the teeth of the cultivating reel herein disclosed. When any form of cultivator encounters such a lump and separates it from adjacent portions of the soil, any weed root extending through such lump is necessarily retained therein in condition for further growth. In order therefore, to accomplish weed removal in accordance with the present invention, it is very desirable that the high speed reel be directly coupled with the plow so as to float on the freshly plowed surface for the immediate disintegration of the earth and to free and immediately lift to the surface all weed roots therein contained.

As above pointed out, the application of this device to a wheel plow arranged for tractor operation, does not interfere with control of the apparatus from the seat of the track. When the plow is lowered all slack in chain 29 is taken up by the chain tightening device 35 by means of tension spring 36, and the reel floats on the surface of the earth while turning rapidly in the course of travel of the apparatus, hurling finely pulverized earth rearwardly and weed roots upwardly. When the plow is elevated it picks up the sub-frame of the cultivator and lifts the reel also from the earth so that the tractor may proceed unhampered.

We claim:

1. An agricultural implement comprising the combination with a plow adjustable to and from operative position, of a sub-frame adapted for limited independent movement with respect to said plow, guides for said sub-frame adapted to pick up said sub-frame in the movement of said plow to its inoperative position, and a cultivator carried by said sub-frame.

2. An agricultural implement comprising the combination with a plow adjustable to and from operative position, of a sub-frame adapted for limited independent movement with respect to said plow, guides for said sub-frame adapted to pick up said sub-frame in the movement of said plow to its inoperative position, and a cultivator carried by said sub-frame and comprising a rotatable reel adapted in the operative position of said plow to float on earth turned thereby.

3. An agricultural implement comprising the combination with a plow adjustable to and from operative position, of a sub-frame adapted for limited independent movement with respect to said plow, guides for said sub-frame adapted to pick up said sub-frame in the movement of said plow to its inoperative position, and a cultivator carried by said sub-frame and comprising a rotatable reel adapted in the operative position of said plow to float on earth turned thereby, and provided with means for rotating it in the direction of its travel at a rate greater than its ground speed.

4. An agricultural implement comprising the combination with a plow adjustable to and from operative position, of a sub-frame adapted for limited independent movement with respect to said plow, guides for said sub-frame adapted to pick up said sub-frame in the movement of said plow to its inoperative position, and a cultivator carried by said sub-frame and comprising a rotatable reel adapted in the operative position of said plow to float on earth turned thereby, and provided with means for rotating it in the direction of its travel at a rate greater than its ground speed, said reel being provided with teeth.

5. An agricultural implement comprising the combination with a plow adjustable to and from operative position, of a sub-frame adapted for limited independent movement with respect to said plow, guides for said sub-frame adapted to pick up said sub-frame in the movement of said plow to its inoperative position, and a cultivator carried by said sub-frame and comprising a rotatable reel adapted in the operative position of said plow to float on earth turned thereby, and provided with means for rotating it in the direction of its travel at a rate greater than its ground speed, said reel being provided with teeth disposed in successively advanced positions transversely to the reel.

6. The combination with a plow provided with a wheel, of a sub-frame pivoted to said plow, a rotary cultivator carried by said sub-frame, high speed driving connections between said wheel and cultivator, and means for lifting said cultivator with respect to said wheel and comprising a guide connecting said sub-frame and plow and adapted to permit limited movement of said sub-frame independently of said plow.

7. An agricultural implement comprising a reel, means for supporting said reel in free floating movement with limits relative to the soil traversed thereby, and means for rotating said reel at a speed in excess of its ground speed.

8. An agricultural implement comprising a reel, means for supporting said reel in free floating movement with limits relative to the soil traversed thereby, and means for rotating said reel at a speed in excess of its ground speed, said reel being provided with teeth adapted to penetrate the soil which it traverses.

9. An agricultural implement comprising a reel, means for supporting said reel in free floating movement with limits relative to the soil traversed thereby, and means for rotating said reel at a speed in excess of its ground speed, said reel being provided with teeth adapted to penetrate the soil which it traverses, said teeth being disposed transversely of said reel and successively advanced in the direction of its rotation.

10. An agricultural implement comprising a reel, means for supporting said reel in free floating movement with limits relative to the soil traversed thereby, and means for rotating said reel at a speed in excess of its ground speed, said reel being provided with teeth adapted to penetrate the soil which it traverses, said teeth being disposed transversely of said reel and successively advanced in the direction of its rotation, bars supporting said teeth, and means connecting said bars between said teeth and adapted to assist in floating said reel on the surface of the ground traversed by it.

ERWIN L. SCHULTZ.
FRANK HALLISCH.